(12) United States Patent
Wang et al.

(10) Patent No.: US 9,236,949 B1
(45) Date of Patent: Jan. 12, 2016

(54) LASER TRANSCEIVER WITH IMPROVED BIT ERROR RATE

(71) Applicant: Applied Optoelectronics, Inc., Sugar Land, TX (US)

(72) Inventors: Yi Wang, Katy, TX (US); Huanlin Zhang, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 14/312,930

(22) Filed: Jun. 24, 2014

(51) Int. Cl.
| | | |
|---|---|---|
| H04B 10/00 | (2013.01) | |
| H04B 10/58 | (2013.01) | |
| H04B 10/50 | (2013.01) | |
| H04B 10/40 | (2013.01) | |
| H04J 14/02 | (2006.01) | |

(52) U.S. Cl.
CPC ............... *H04B 10/58* (2013.01); *H04B 10/40* (2013.01); *H04B 10/503* (2013.01); *H04J 14/02* (2013.01)

(58) Field of Classification Search
CPC ........ H04B 10/40; H04B 10/50; H04B 10/58; H04B 10/60; H04B 10/504; H04B 10/695
USPC ............... 398/68, 69, 70, 71, 72, 79, 81, 147, 398/158, 159, 135, 136, 137, 138, 139, 202, 398/208, 209, 193, 194, 195, 196, 197, 198, 398/199, 200, 201, 19
See application file for complete search history.

(56) References Cited

U.S. PATENT DOCUMENTS

| | | | |
|---|---|---|---|
| 5,504,772 | A | 4/1996 | Deacon et al. |
| 6,031,645 | A * | 2/2000 | Ichikawa ........................ 398/41 |
| 7,376,352 | B2 * | 5/2008 | Tayebati et al. ............... 398/147 |
| 7,406,267 | B2 * | 7/2008 | Mahgerefteh et al. ........ 398/201 |
| 8,116,628 | B2 * | 2/2012 | Lee et al. ......................... 398/72 |
| 2003/0179791 | A1 | 9/2003 | Hiroshi et al. |
| 2004/0161239 | A1 | 8/2004 | Bruesselbach et al. |
| 2008/0165337 | A1 | 7/2008 | Ershov et al. |
| 2008/0267242 | A1 | 10/2008 | Ershov et al. |
| 2010/0178059 | A1 * | 7/2010 | Shou et al. .................... 398/136 |
| 2012/0301151 | A1 * | 11/2012 | Hu et al. ....................... 398/135 |

OTHER PUBLICATIONS

Park, Soo-Jin et al, "Fiber-to-the-Home Services Based on Wavelength-Division-Multiplexing Passive Optical Network", Journal of Lightwave Technology, vol. 22, No. 11, Nov. 2004, pp. 2582-2591.
Mun, Sil-Gu et al, "A WDM-PON with a 40 Gb/s (32x1.25 Gb/s) capacity based on wavelength-locked Fabry-Perot laser diodes", Optics Express, vol. 16, No. 15, Jul. 21, 2008, pp. 11361-11368.

(Continued)

*Primary Examiner* — Hanh Phan
(74) *Attorney, Agent, or Firm* — Grossman Tucker Perreault & Pfleger, PLLC; Norman S. Kinsella

(57) ABSTRACT

An optical transceiver generally includes an injection locked (IL) laser configured to generate a transmit (Tx) optical signal for transmission over an optical network and a laser driver circuit configured to modulate the IL laser based on a Tx data signal. The Tx data signal may be provided to the optical transceiver for transmission over the optical network. The Tx data signal may include a crossing point level associated with a transition between a first signal level and a second signal level. The optical transceiver may also include a crossing point control circuit configured to apply distortion to the Tx data signal, the distortion to increase the crossing point level.

23 Claims, 5 Drawing Sheets

(56) References Cited

OTHER PUBLICATIONS

Zhang, H.L. et al, "32-Channel, Injection-Locked WDM-PON SFP Transceivers for Symmetric 1.25 Gbps Operation", OFC 2011, NTuB4, Los Angeles, CA, Mar. 8, 2011, 3 pgs.
"Small Form Factor Transceiver Multisource Agreement—Cooperation Agreement for Small Form Factor Transceivers", Jan. 6, 1998, pp. 1-8.
"Small Form-Factor Pluggable (SFP) Transceiver MultiSource Agreement (MSA)—Cooperation Agreement for Small Form-Factor Pluggable Transceivers", Sep. 14, 2000, pp. 1-38.
Morbi, Zulfikar, "Technology Drivers in WDM-PON: A look at the components, comparison to GPON/XG-PON and the perception in the Marketplace", FTTH WEM-PON Workshop, Las Vegas, NV, Sep. 12, 2010, 22 pgs.
PCT International Search Report and Written Opinion mailed Sep. 11, 2015, received in corresponding PCT Application No. PCT/US15/37316, 9 pgs.

* cited by examiner

LASER TRANSCEIVER WITH IMPROVED BIT ERROR RATE

TECHNICAL FIELD

The present invention relates to laser transceivers, and more particularly, to an injection locked laser transceiver with crossing point adjustment circuitry for improved bit error rate for use in a wavelength division multiplexed passive optical network.

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. At each subscriber location, an optical networking terminal (ONT) or optical networking unit (ONU) is assigned one or more of the channel wavelengths for sending and/or receiving optical signals.

A challenge in a WDM-PON, however, is designing a network that will allow the same transmitter to be used in an ONT or ONU at any subscriber location. For ease of deployment and maintenance in a WDM-PON, it is desirable to have a "colorless" ONT/ONU whose wavelength can be changed or tuned such that a single device could be used in any ONT/ONU on the PON. With a "colorless" ONT/ONU, an operator only needs to have a single, universal transmitter or transceiver device that can be employed at any subscriber location.

One or more tunable lasers may be used to select different wavelengths for optical signals in a WDM system or network such as a WDM-PON. Various different types of tunable lasers have been developed over the years, but most were developed for high-capacity backbone connections to achieve high performance and at a relatively high cost. Less expensive tunable lasers have been developed, such as, for example the injection locked (IL) laser which is seeded by a filtered broadband light source (BLS). The IL laser is effectively tuned to the wavelength associated with the pass band of the BLS filter. The IL laser, however, is typically noisier than other, more expensive, tunable lasers and lacks the linearity properties of those more expensive lasers. This can cause distortion of the pulse width of the modulating signal which results in an increased communication bit error rate (BER).

BRIEF DESCRIPTION OF THE DRAWINGS

These and other features and advantages will be better understood by reading the following detailed description, taken together with the drawings wherein.

DETAILED DESCRIPTION

A laser transceiver with improved bit error rate, consistent with embodiments described herein, generally includes an injection locked (IL) laser transmitter module with driver circuitry configured to adjust the crossing point of the modulating RF signal to reduce distortion during transmission. The transceiver may also include a receiver module with a low-pass filter to reduce high frequency received noise, and a decision threshold circuit configured to lower the received signal decision threshold to a level where noise is reduced. The adjustments of the crossing point for transmission and the decision threshold for reception may be adaptively set and/or updated by a microcontroller or other processor based on operating characteristics of the system, such as, for example, the type of IL laser being used.

The laser transceiver may be used in a wavelength division multiplexed (WDM) passive optical network (PON). The transceiver may be incorporated, for example, in an optical networking terminal (ONT), optical line terminal (OLT) or optical networking unit (ONU) of the WDM PON. The reduction of noise and distortion may lower communication bit error rates and improve communication over the optical network.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. As used herein, "tuning to a channel wavelength" refers to adjusting a laser output such that the emitted laser light includes the channel wavelength. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1:
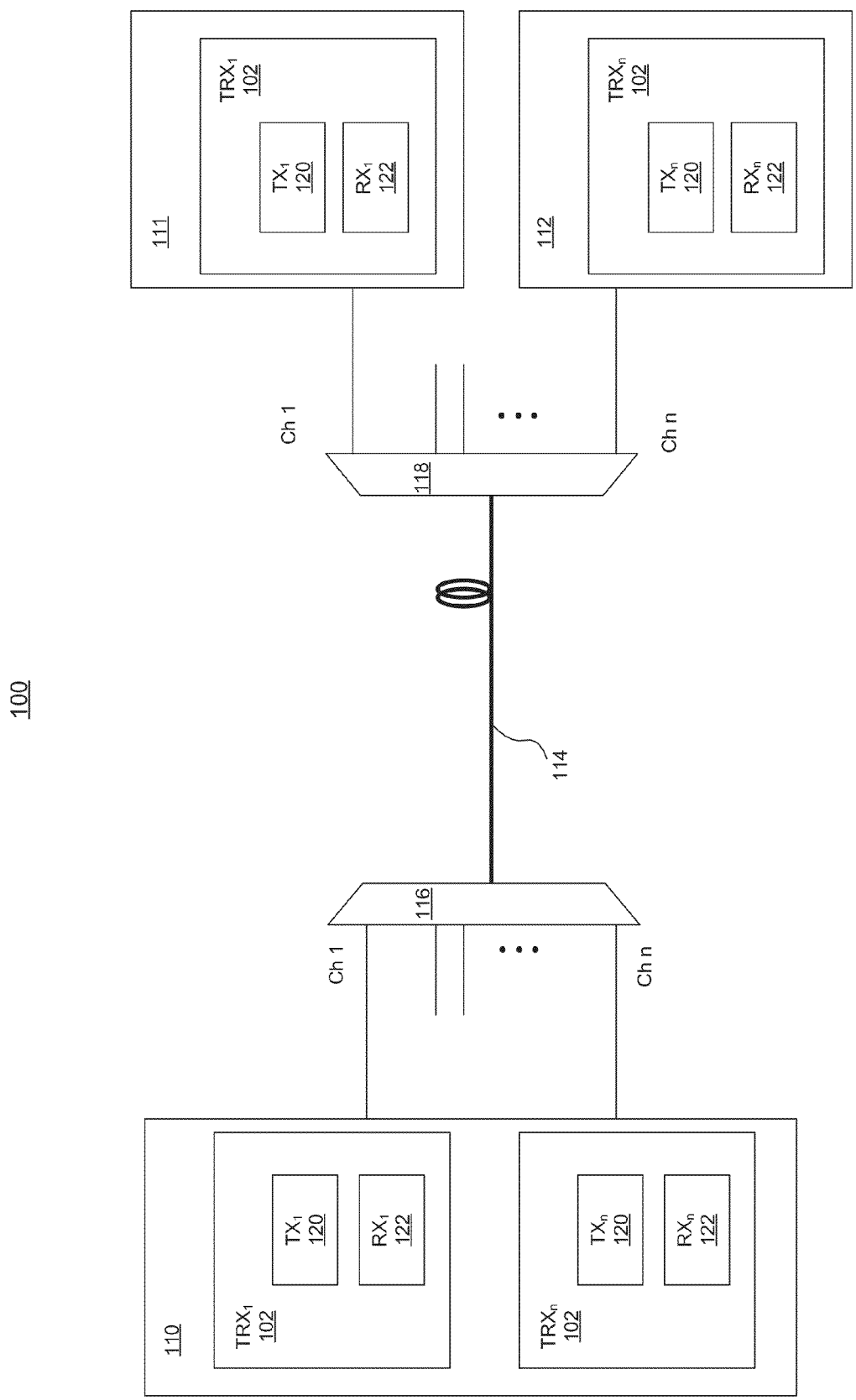
FIG. 1 is a top level schematic diagram of a wavelength division multiplexed (WDM) optical communication system including at least one transceiver, consistent with embodiments of the present disclosure.

Referring to FIG. 1, a WDM optical communication system 100 including one or more transceivers 102 with reduced bit error rate, consistent with embodiments of the present disclosure, is shown and described. The WDM system 100 includes one or more terminals 110, 111, 112 coupled at each end of a trunk optical fiber or path 114 for transmitting and receiving optical signals at different channel wavelengths over the trunk optical path 114. Terminal 110 may be an optical line terminal (OLT) while terminals 111 and 112 may be optical networking units (ONUs). The terminals 110, 111, 112 at each end of the WDM system 100 include one or more transceivers 102 which further include transmitters 120 (e.g., $T_{X1}$ to $T_{Xn}$) and receivers 122 (e.g., $R_{X1}$ to $R_{Xn}$) associated with different channels (e.g., Ch. 1 to Ch. n) for transmitting and receiving optical signals at the different channel wavelengths between the one or more terminals 110, 111, 112.

Each terminal 110, 111, 112 may include one or more transmitters 120 and receivers 122, and the transmitters 120 and receivers 122 may be separate or integrated as a transceiver within a terminal. Optical multiplexers/demultiplexers 116, 118 at each end of the WDM system 100 combine and separate the optical signals at the different channel wavelengths. Aggregate WDM optical signals including the combined channel wavelengths are carried on the trunk optical path 114. One or more of the transmitters 120 may be a tunable transmitter capable of being tuned to the appropriate channel wavelength through injection locking based on seeding from a broadband light source, as will be described in greater detail below. Thus, the transmitters 120 may be constructed as universal transmitters capable of being used in different locations in the WDM system 100 and tuned to the appropriate channel wavelength depending upon the location in the WDM system 100.

Figure 2:
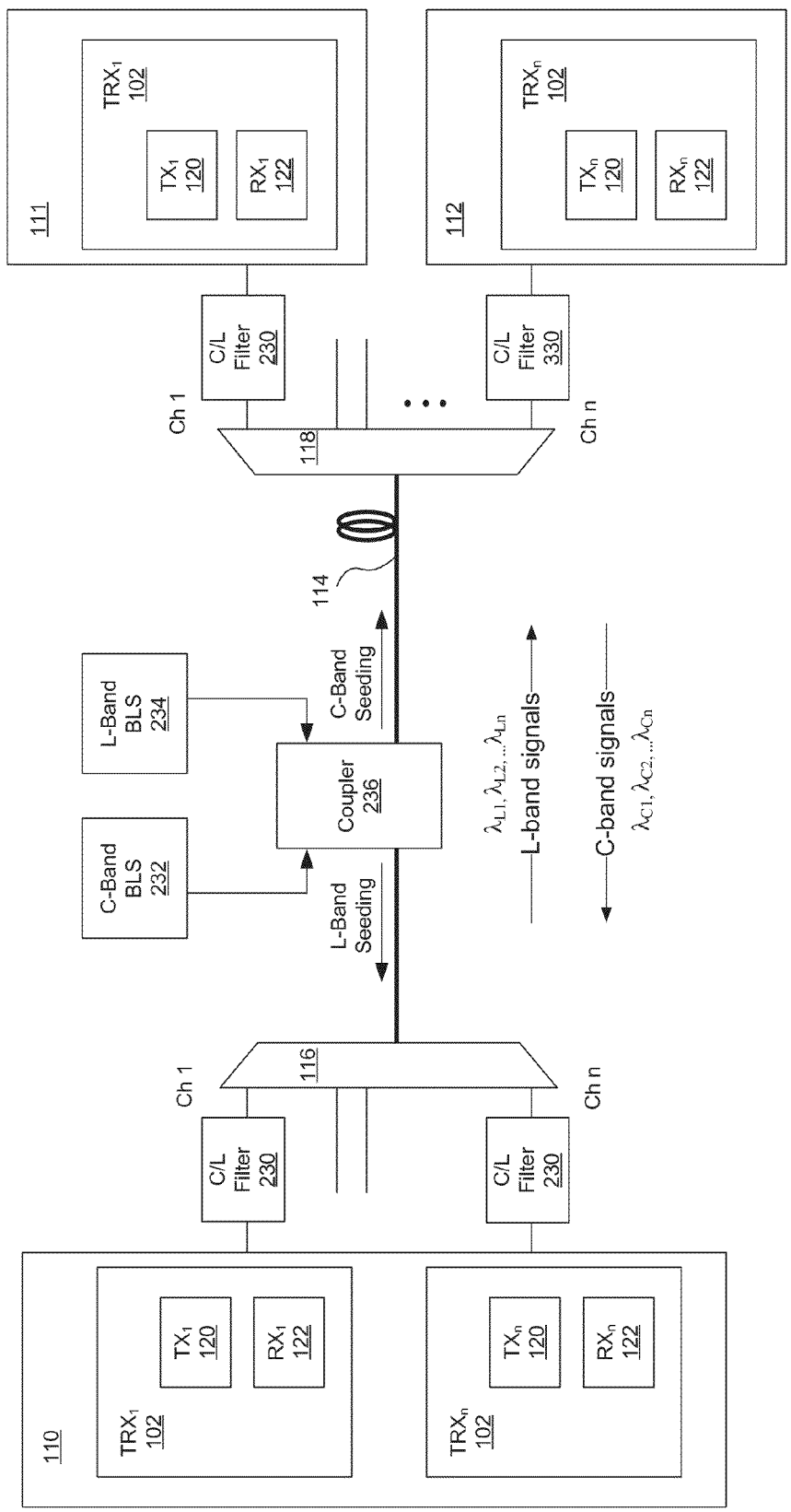
FIG. 2 is a schematic diagram of a wavelength division multiplexed (WDM) passive optical network (PON) including at least one transceiver, consistent with embodiments of the present disclosure.

Referring to FIG. 2, an embodiment of the WDM optical communication system of FIG. 1 is shown in greater detail. One or more transceivers, consistent with embodiments of the present disclosure, may be used to transmit and receive optical signals in a WDM-PON 200. The WDM-PON 200 provides a point-to-multipoint optical network architecture using a WDM system. According to one embodiment of the WDM-PON 200, at least one optical line terminal (OLT) 110 may be coupled to a plurality of optical networking terminals (ONTs) or optical networking units (ONUs) 111, 112, . . . , etc. via optical fibers, waveguides, and/or paths 114. The OLT 110 and the ONUs 111, 112 include one or more optical transceivers 102 configured to provide reduced bit error rates, as described in greater detail below.

The OLT 110 may be located at a central office of the WDM-PON 200, and the ONUs 111, 112 may be located in homes, businesses or other types of subscriber location or premises. The optical demultiplexer 118, or branching point, may be configured to couple a trunk optical path 114 to separate optical paths to the ONUs 111, 112, at the respective subscriber locations. The branching point may include one or more passive coupling devices such as a splitter or optical multiplexer/demultiplexer. An optical multiplexer/demultiplexer, for example 116, 118, may be an arrayed waveguide grating (AWG) configured to combine and/or split the optical signals at the different respective channel wavelengths (e.g., $\lambda_{L1}, A_{L2}, \ldots \lambda_{Ln}$). In one example, the ONUs 111, 112 may be located about 20 km or less from the OLT 110.

One application of the WDM-PON 200 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 200, different ONUs 111, 112 may be assigned different channel wavelengths for transmitting and receiving optical signals. In one embodiment, the WDM-PON 200 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 111, 112 may thus be assigned different channel wavelengths within the L-band and within the C-band. Transceivers or receivers located within the ONUs 111, 112 may be configured to receive an optical signal on at least one channel wavelength in the L-band (e.g., $\lambda_{L1}, \lambda_{L2}, \ldots \lambda_{Ln}$). Transceivers or transmitters located within the ONUs 111, 112 may be configured to transmit an optical signal on at least one channel wavelength in the C-band (e.g., $\lambda_{C1}, \lambda_{C2}, \ldots \lambda_{Cn}$) based on seeding of the laser as will be explained in greater detail below. Other wavelengths and wavelength bands are also within the scope of the system and method described herein.

One embodiment of the ONUs 111, 112 includes a transceiver 102 comprising an (IL) laser for transmitting an optical signal at the assigned channel wavelength ($\lambda_{C1}$) and a photodetector, such as a photodiode, for receiving an optical signal at the assigned downstream channel wavelength ($\lambda_{L1}$).

The OLT 110 may be configured to generate multiple optical signals at different channel wavelengths (e.g., $\lambda_{L1}, \lambda_{L2}, \ldots \lambda_{Ln}$) and to combine the optical signals into the downstream WDM optical signal carried on the trunk optical fiber or path 114. The OLT 110 may also be configured to separate optical signals at different channel wavelengths (e.g., $\lambda_{C1}, \lambda_{C2}, \ldots \lambda_{Cn}$) from an upstream WDM optical signal carried on the trunk path 114 and to receive the separated optical signals.

Transceivers or transmitters located within the OLT 110 may be configured to transmit an optical signal on at least one channel wavelength in the L-band (e.g., $\lambda_{L1}, \lambda_{L2}, \ldots \lambda_{Ln}$) based on seeding of the laser as will be explained in greater detail below. Other wavelengths and wavelength bands are also within the scope of the system and method described herein.

The IL lasers of transceivers 102 may be modulated by RF data signals to generate the respective optical signals. The lasers may be modulated using various modulation techniques including external modulation and direct modulation.

In one embodiment, one or more broadband light sources (BLSs), for example a C-band BLS 232 and an L-band BLS 234, may be configured to generate broadband light over a desired wavelength range such as the C-band or the L-band, respectively. The broadband light generated by module 232 and 234 may be coupled, by optical coupler 236, into the trunk path 114 such that L-band seeding is provided to the OLT 110 and C-band seeding is provided to ONUs 111, 112. C/L filter modules 230 may be provided in the path to each transceiver 102 and configured to separate incoming C-band (or L-band) wavelength light from outgoing L-band (or C-band) wavelength light respectively. Thus, for example, the receivers 122 of each transceiver 102 of OLT 110 will receive the appropriate C-band signal wavelength assigned to that receiver. Likewise, the IL lasers of each transmitter 120 of each transceiver 102 of the OLT will receive the appropriate L-band wavelength seeding signal so that the IL laser may transmit at the assigned wavelength within the L-band.

Similarly, for example, the receivers 122 of each transceiver 102 of ONUs 111, 112 will receive the appropriate L-band signal wavelength assigned to that receiver. Likewise, the IL lasers of each transmitter 120 of each transceiver 102 of the ONUs will receive the appropriate C-band wavelength seeding signal so that the IL laser may transmit at the assigned wavelength within the C-band.

Figure 3:
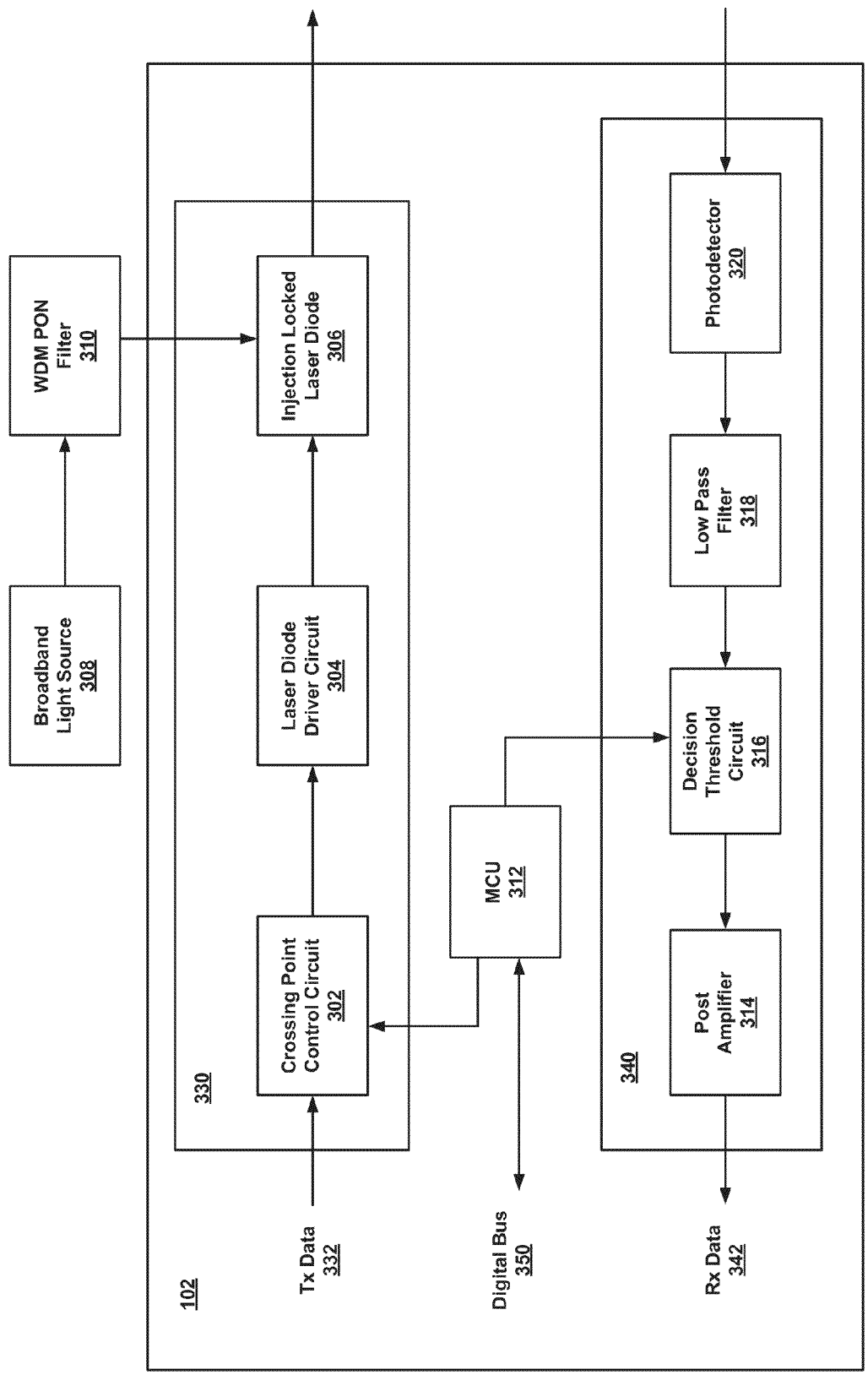
FIG. 3 is a schematic diagram of an optical transceiver with improved bit error rate, consistent with embodiments of the present disclosure.

Referring to FIG. 3, a transceiver with improved bit error rate is described in greater detail. In some embodiments, the transceiver 102 includes a transmitter component 330 (e.g., TX 120 of FIG. 1) and a receiver component 340 (e.g., RX 122 of FIG. 1), either or both of which may be under the control of a processor or micro-controller unit (MCU) 312, as will be explained below.

The transmitter component 330 may include an IL laser diode 306 configured to generate laser light in a desired wavelength range for transmission over an optical network, for example the WDM PON 200. The IL laser is considered to be a "colorless" laser because it does not have a predefined lasing wavelength, but rather it lasses at the wavelength of an injected seeding light and may lock onto the injected seeding light over a relatively wide range of wavelengths. The laser diode 306 is seeded by a broadband light source (BLS) 308 that is filtered by a WDM PON filter 310 which is configured as a narrow band-pass optical filter. The BLS 308 may emit light that covers a wide range of wavelengths. The filter 310 is configured to filter the light provided by the BLS 308 down to a wavelength range that corresponds to the desired wavelength range for the laser 306 and thus seeds the laser for transmission at that wavelength. In some embodiments, the filter 310 may be a thin-film filter or an array waveguide grating (AWG). The BLS 308 may correspond, for example, to the C-band BLS 232 and/or the L-band BLS 234 of FIG. 2. The WDM PON filter 310 may be incorporated, for example, in the optical multiplexer/demultiplexer (e.g., AWG) modules 116, 118 of FIG. 2.

Laser diode driver circuit 304 is electrically coupled to laser 306 and may be configured to drive the laser by applying a driving current to induce lasing. The laser driver circuit 304 may modulate the laser 306 with an electrical signal that represents the signal intended for transmission, Tx Data 332, which will typically be provided as a radio frequency (RF) signal. The driver 304 thus causes the laser 306 to generate a modulated optical signal for transmission at the desired channel wavelength. The crossing point control circuit 302 may be configured to adjust the waveform shape of the Tx Data signal 332 to improve the transmission characteristics of the signal, as explained below.

Figure 4:
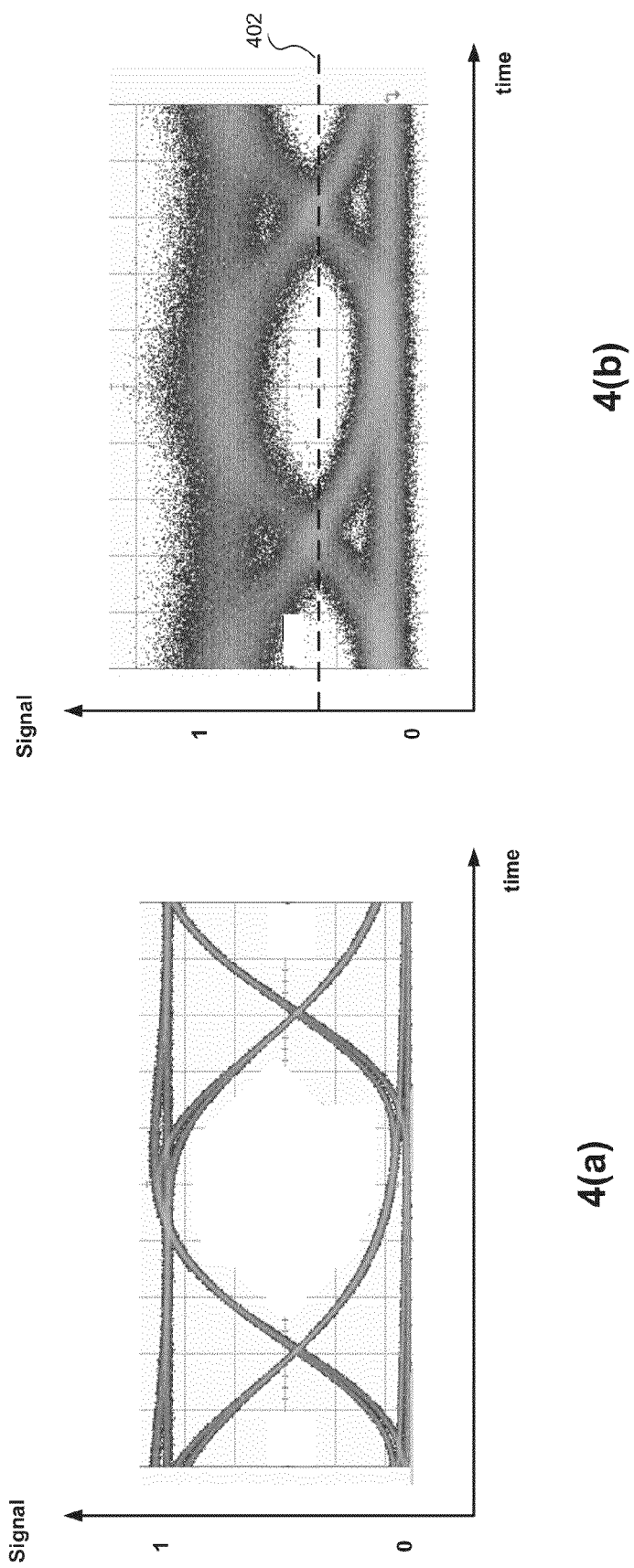
FIG. 4 is a signal diagram illustrating an eye pattern, consistent with an embodiment of the present disclosure.

The TX data signal 332 may be a binary signal (e.g., on-off keying modulated signal) having an amplitude or voltage that transitions between a first value associated with a logical '0' signal level and a second value associated with a logical '1' signal level, as illustrated in FIG. 4(a), which is commonly referred to as an "eye" diagram. The signal shown in FIG. 4(a) is relatively clean and symmetric (e.g., the crossing point being approximately halfway between the two signal levels). In such a case it may be straightforward to distinguish a '1' from a '0' after transmission and reception of the modulated optical signal. Unfortunately, due to the nature of the BLS 308, which is typically an amplified spontaneous emission (ASE) light source, the light from an IL laser 306 is generally noisier than the light produced by a more expensive distributed feedback (DFB) or Fabry-Perot (FP) laser. Additionally, the fabrication techniques for an IL laser may result in a laser chip design having a longer dimensional length, which may adversely affect the linearity of the IL laser. This non-linearity may shift the crossing point of the eye diagram down towards the '0' level causing pulse width distortion (e.g., the pulse width of the '0' signal is different from the pulse width of the '1' signal) resulting in communication errors (e.g., higher bit error rates). FIG. 4(b) illustrates an example of such a noisier and distorted signal.

The crossing point control circuit 302 may be configured to adjust the waveform shape of the Tx Data signal 332, used to modulate/drive the laser, by pre-distorting the signal to shift the crossing point to a higher value or level. This pre-distortion may, at least partially, compensate for the subsequent signal distortion introduced by the non-linear characteristics of the IL laser. The resulting transmitted optical signal may therefore have a crossing point closer to the desired halfway point between the level '1' and level '0' signals. The amount of pre-distortion may be controlled by the MCU 312 and may depend on the characteristics of the particular IL laser being used, for example measured or otherwise known distortion, and/or any other relevant factors.

The receiver component 340 may include a photodetector 320 configured to receive an optical signal from an optical network, for example the WDM PON 200. The received signal may also be a binary signal (e.g., on-off keying modulated signal). In some embodiments, the photodetector may include a trans-impedance amplifier to provide an initial amplification of the received signal before subsequent processing operations are performed. The photodetector converts the received optical signal into an electrical signal, which may, for example, be in the RF frequency range. A low-pass filter 318 may process the output of the photodetector 320 to limit the bandwidth of the received signal and remove the higher frequency noise that may have been introduced by the IL laser and/or the transmission through the optical network. The low pass filter may have a cut-off frequency, above which noise is filtered. In some embodiments, the cut-off frequency may be fixed or adjustable.

A decision threshold circuit 316 may be configured to set a threshold for determining whether the received signal represents a logical '0' signal level or a logical '1' signal level. FIG. 4(b) illustrates an example decision threshold 402. In the absence of noise, distortion or other undesirable interference, the decision threshold might be set to approximately 50 percent of the full scale signal amplitude or approximately halfway between the expected signal amplitude associated with a level '1' and a level '0.' However, in practice, a lower decision threshold may improve receiver performance since more noise is typically associated with the '1' level due to the operating characteristics of the IL laser. In some preferred embodiments, a decision threshold in the range of approximately 20 to 30 percent of the full scale signal amplitude (e.g., the expected signal amplitude associated with a level '1').

In some embodiments, the decision threshold may be adaptively set in response to changing characteristics or conditions of the transceiver system and/or the optical network. The threshold may be set, for example, by the MCU 312.

In some embodiments, the decision threshold adjustment may be performed as part of the post-amplifier circuit or module 314 which is configured to provide the received data signal RX Data 342 to the ONU or OLT as, for example, an RF signal in a desired voltage range.

The crossing point control circuit 302 and decision threshold circuit 316 may be under the control of a processor or MCU 312 which may receive data/commands, for example over a digital bus 350, from an external entity that is employing the transceiver 102. In some embodiments, the digital bus may conform to the inter-integrated circuit ($I^2C$) standard or the small form factor (SFF) multi-source agreement (MSA) standard. For example, the MCU may be configured to receive a request or instruction to adjust the crossing point of the modulating transmit signal or adjust the decision threshold of the received signal. In response to that request, the MCU may generate the control signals necessary to achieve these conditions and provide these control signals to the crossing point control circuit 302 and/or the decision threshold circuit 316. The MCU may operate based on software execution/programming, firmware, hardware or any combination thereof.

In some embodiments, the transceiver circuit 102 may conform to the dimensions of the Small Form Factor (SFF) or a Small Form Factor Pluggable (SFP) transceiver size specification. These dimensions are set forth, for example, in the "Small Form Factor Transceiver Multisource Agreement," dated Jan. 6, 1998, and the "Small Form Factor Pluggable Transceiver Multisource Agreement," dated Sep. 14, 2000. It will be appreciated that the bit error rate reduction techniques described herein, which enable the use of the relatively less complex IL laser, allows for a decrease in size (and cost) of the transceiver. This may contribute, at least in part, to the ability to conform to the SFF/SFP specification.

Figure 5:
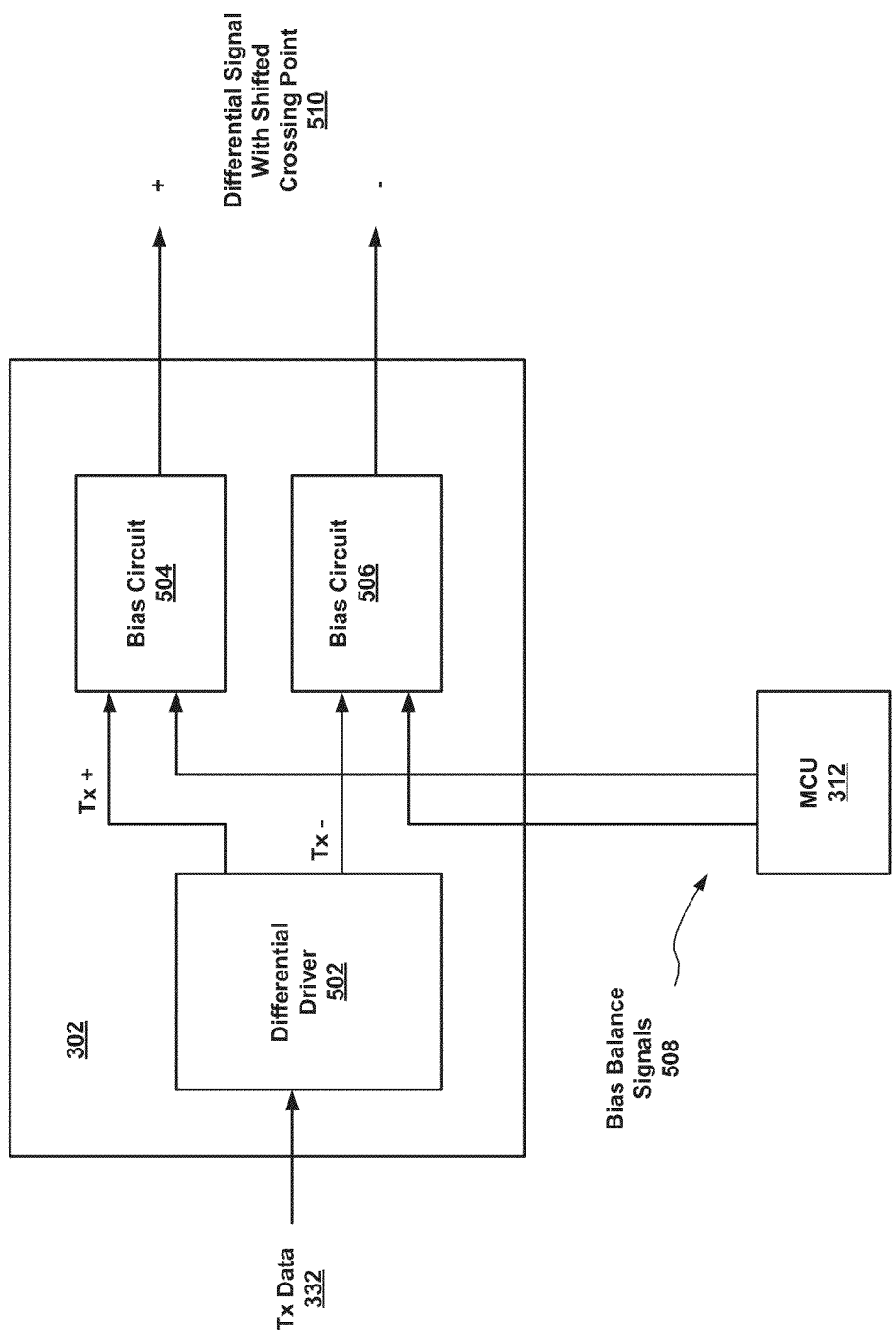
FIG. 5 is a schematic diagram of a crossing point control circuit of an optical transceiver, consistent with another embodiment of the present disclosure.

Referring to FIG. 5, a schematic diagram of one example embodiment of the crossing point control circuit 302 is shown in greater detail. Differential driver circuit 502 may be configured to convert the Tx Data signal 332 into a differential version of that signal (e.g, Tx+ and Tx−) each of which is coupled to a bias circuit 504 and 506 respectively. The MCU 312 provides bias balance signals 508 to each of the bias circuits 504, 506 which may shift the levels of each differential component such that the crossing point of the resulting differential signal 510 may be adjusted to a higher value.

Accordingly, an optical transceiver, with signal crossing point control and decision threshold circuitry, consistent with embodiments described herein, may provide communications with reduced bit error rate over a WDM PON. The optical transceiver may use a relatively inexpensive IL laser and may conform to a relatively small form factor.

Consistent with one embodiment, an optical transceiver generally includes an injection locked (IL) laser configured to generate a transmit (Tx) optical signal for transmission over an optical network and a laser driver circuit configured to modulate the IL laser based on a Tx data signal. The Tx data signal may be provided to the optical transceiver for transmission over the optical network. The Tx data signal may include a crossing point level associated with a transition between a first signal level and a second signal level. The optical transceiver may also include a crossing point control circuit configured to apply distortion to the Tx data signal, the distortion to increase the crossing point level.

Consistent with another embodiment, an optical networking unit includes an injection locked (IL) laser configured to generate a transmit (Tx) optical signal for transmission over an optical network at a transmission channel wavelength, wherein the transmission channel wavelength is in one of the L-band or the C-band. The ONU also includes a laser driver circuit configured to modulate the IL laser based on a Tx data signal, the Tx data signal provided to the optical transceiver for transmission over the optical network. The Tx data signal includes a crossing point level associated with a transition between a first signal level and a second signal level. The ONU further includes a crossing point control circuit configured to apply distortion to the Tx data signal, the distortion to increase the crossing point level. The ONU further includes a photodetector configured to convert a received (Rx) optical signal from the optical network to an electrical Rx data signal, the Rx optical signal received at an Rx channel wavelength in one of the L-band or the C-band.

Consistent with a further embodiment, a wavelength division multiplexed (WDM) system includes a plurality of terminals associated with different respective channel wavelengths and configured to transmit optical signals on the different respective channel wavelengths. At least one of the plurality of terminals includes at least an optical transceiver. The optical transceiver includes an injection locked (IL) laser configured to generate a transmit (Tx) optical signal for transmission over an optical network. The optical transceiver also includes a laser driver circuit configured to modulate the IL laser based on a Tx data signal, the Tx data signal provided to the optical transceiver for transmission over the optical network. The Tx data signal includes a crossing point level associated with a transition between a first signal level and a second signal level. The optical transceiver further includes a crossing point control circuit configured to apply distortion to the Tx data signal, the distortion to increase the crossing point level.

Consistent with yet another embodiment, a method includes providing an injection locked (IL) laser configured to generate a transmit (Tx) optical signal for transmission over an optical network. The method also includes modulating the IL laser based on a Tx data signal, the Tx data signal provided to the optical transceiver for transmission over the optical network. The Tx data signal includes a crossing point level associated with a transition between a first signal level and a second signal level. The method further includes applying distortion to the Tx data signal to increase the crossing point level. The method further includes converting a received (Rx) optical signal from the optical network to an electrical Rx data signal; and adjusting a threshold for determining whether the Rx data signal corresponds to the first signal level or the second signal level.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical transceiver comprising:
   an injection locked (IL) laser configured to generate a transmit (Tx) optical signal for transmission over an optical network;
   a laser driver circuit configured to modulate said IL laser based on a Tx data signal, said Tx data signal provided to said optical transceiver for transmission over said optical network, said Tx data signal comprising a crossing point level associated with a transition between a first signal level and a second signal level; and
   a crossing point control circuit to receive said Tx data signal, to convert said Tx data signal into a first differential Tx data signal and a second differential Tx data signal, and to apply a pre-distortion by shifting levels of each of said first and said second differential Tx data signals to increase said crossing point level.

2. The transceiver of claim 1, further comprising a photodetector configured to convert a received (Rx) optical signal from said optical network to an electrical Rx data signal.

3. The transceiver of claim 2, further comprising a low pass filter configured to reduce noise in said Rx data signal, said noise above a cutoff frequency associated with said low pass filter.

4. The transceiver of claim 2, further comprising a decision threshold circuit configured to adjust a threshold for determining whether said Rx data signal corresponds to said first signal level or said second signal level.

5. The transceiver of claim 4, further comprising a processor configured to receive digital data and to control said threshold adjustment generated by said decision threshold circuit, based on said digital data.

6. The transceiver of claim 1, further comprising a processor configured to receive digital data and to control said distortion applied by said crossing point control circuit, based on said digital data.

7. The transceiver of claim 1, wherein said IL laser generates said Tx optical signal at a wavelength range associated with a filtered broadband light source (BLS).

8. The transceiver laser of claim 1, wherein said transceiver is a component of an Optical Networking Unit (ONU), said ONU conforming to one of a Small Form Factor (SFF) or a Small Form Factor Pluggable (SFP) transceiver size specification.

9. An optical networking unit comprising:
- an injection locked (IL) laser configured to generate a transmit (Tx) optical signal for transmission over an optical network at a transmission channel wavelength, wherein the transmission channel wavelength is in one of the L-band or the C-band;
- a laser driver circuit configured to modulate said IL laser based on a Tx data signal provided for transmission over said optical network, said Tx data signal comprising a crossing point level associated with a transition between a first signal level and a second signal level;
- a crossing point control circuit to receive said Tx data signal, to convert said Tx data signal into a first differential Tx data signal and a second differential Tx data signal, and to apply a pre-distortion by shifting levels of each of said first and said second differential Tx data signals to increase said crossing point level; and
- a photodetector configured to convert a received (Rx) optical signal from said optical network to an electrical Rx data signal, said Rx optical signal received at an Rx channel wavelength in one of the L-band or the C-band.

10. The optical networking unit of claim 9, further comprising a low pass filter configured to reduce noise in said Rx data signal, said noise above a cutoff frequency associated with said low pass filter.

11. The optical networking unit of claim 9, further comprising a decision threshold circuit configured to adjust a threshold for determining whether said Rx data signal corresponds to said first signal level or said second signal level.

12. The optical networking unit of claim 11, further comprising a processor configured to receive digital data and to control said threshold adjustment generated by said decision threshold circuit, based on said digital data.

13. The optical networking unit of claim 9, further comprising a processor configured to receive digital data and to control said distortion applied by said crossing point control circuit, based on said digital data.

14. The optical networking unit of claim 9, wherein said optical networking unit conforms to one of a Small Form Factor (SFF) or a Small Form Factor Pluggable (SFP) transceiver size specification.

15. A wavelength division multiplexed (WDM) system comprising:
- a plurality of terminals associated with different respective channel wavelengths and configured to transmit optical signals on the different respective channel wavelengths, at least one of the plurality of terminals including at least an optical transceiver comprising:
- an injection locked (IL) laser configured to generate a transmit (Tx) optical signal for transmission over an optical network;
- a laser driver circuit configured to modulate said IL laser based on a Tx data signal, said Tx data signal provided to said optical transceiver for transmission over said optical network, said Tx data signal comprising a crossing point level associated with a transition between a first signal level and a second signal level; and
- a crossing point control circuit to receive said Tx data signal, to convert said Tx data signal into a first differential Tx data signal and a second differential Tx data signal, and to apply a pre-distortion by shifting levels of each of said first and said second differential Tx data signals to increase said crossing point level.

16. The WDM system of claim 15, wherein the plurality of terminals include optical networking units (ONUs) in a WDM passive optical network (PON).

17. The WDM system of claim 16, further comprising:
- at least one optical line terminal (OLT) configured to receive aggregate WDM optical signals including the channel wavelengths;
- at least one branching point coupled between the OLT and the plurality of ONUs, the branching point being configured to combine the optical signals at the channel wavelengths; and
- a trunk optical path coupling the OLT and the branching point.

18. The WDM system of claim 15, wherein said optical transceiver further comprises a photodetector configured to convert a received (Rx) optical signal from said optical network to an electrical Rx data signal.

19. The WDM system of claim 15, wherein said optical transceiver further comprises a decision threshold circuit configured to adjust a threshold for determining whether said Rx data signal corresponds to said first signal level or said second signal level.

20. The WDM system of claim 19, wherein said optical transceiver further comprises a processor configured to receive digital data and to control said threshold adjustment generated by said decision threshold circuit, based on said digital data.

21. The WDM system of claim 15, wherein said optical transceiver further comprises a processor configured to receive digital data and to control said distortion applied by said crossing point control circuit, based on said digital data.

22. A method comprising:
- providing an injection locked (IL) laser configured to generate a transmit (Tx) optical signal for transmission over an optical network;
- modulating said IL laser based on a Tx data signal provided for transmission over said optical network, said Tx data signal comprising a crossing point level associated with a transition between a first signal level and a second signal level;
- converting said Tx data signal into a first differential Tx data signal and a second differential Tx data signal;
- applying pre-distortion by shifting levels of the first differential Tx data signal and the second differential Tx data signal to increase said crossing point level;
- converting a received (Rx) optical signal from said optical network to an electrical Rx data signal; and
- adjusting a threshold for determining whether said Rx data signal corresponds to said first signal level or said second signal level.

23. The method of claim 22, further comprising low pass filtering said Rx data signal to reduce noise in said Rx data signal above a cutoff frequency.

* * * * *